UNITED STATES PATENT OFFICE.

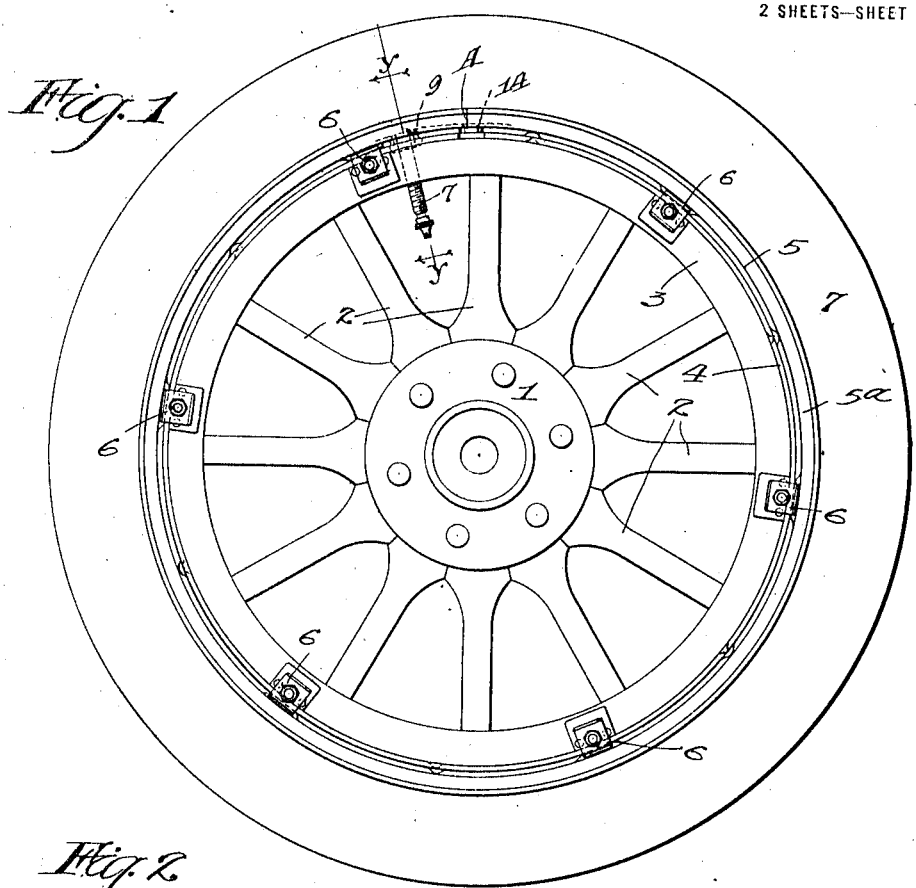
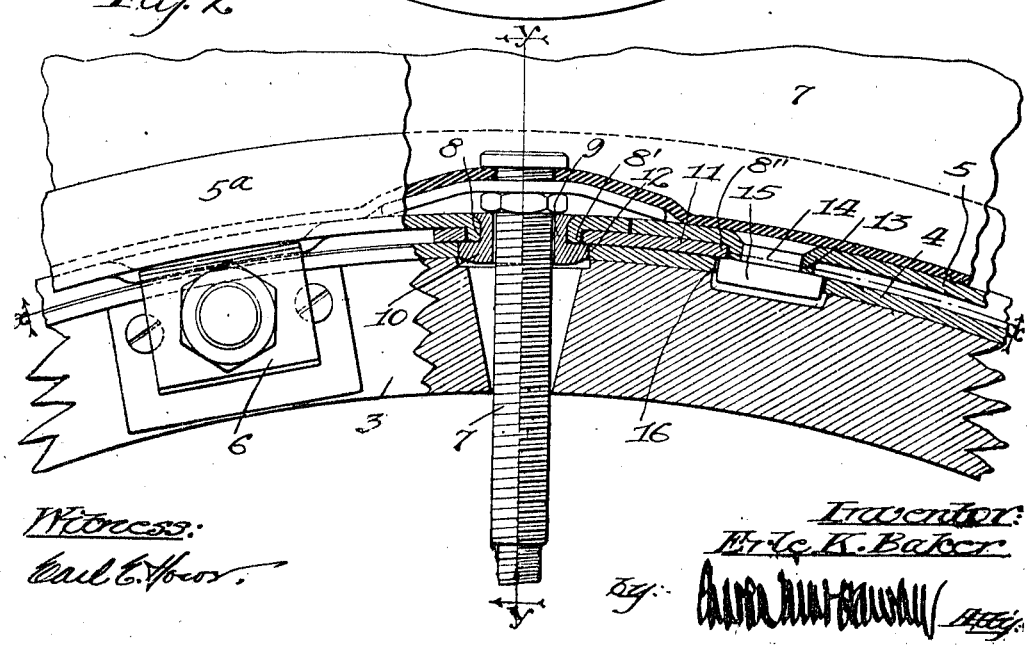

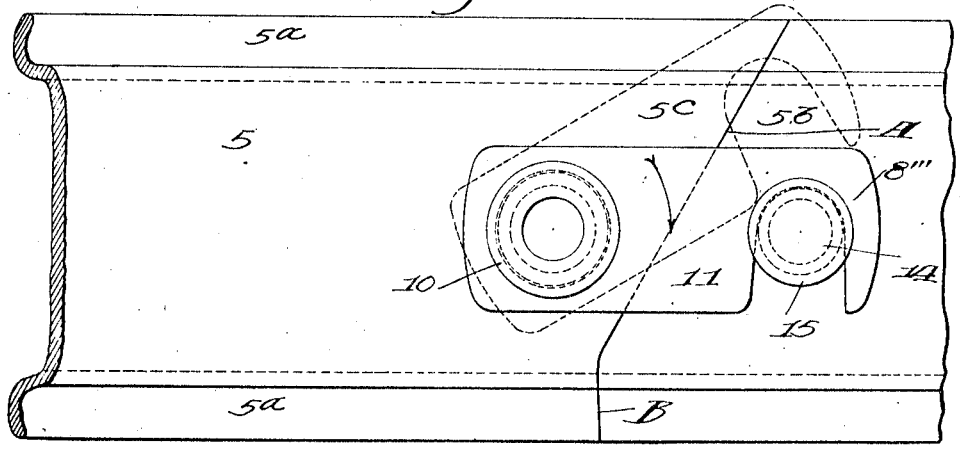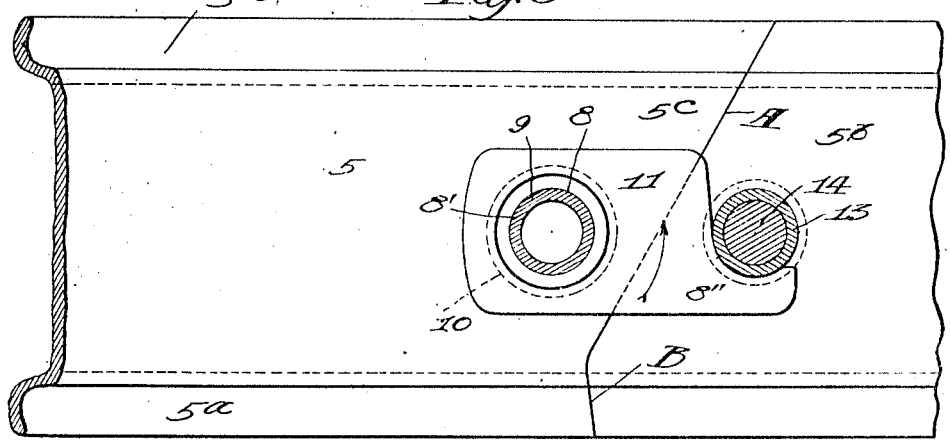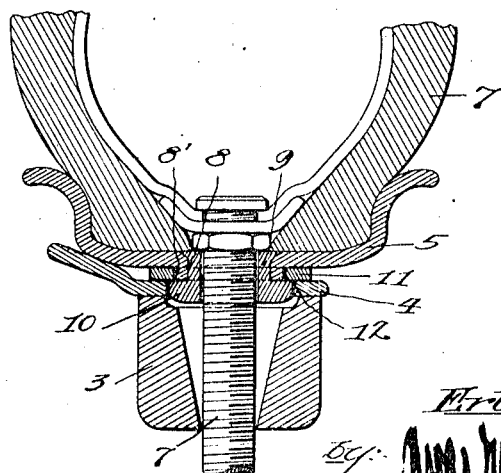

ERLE KING BAKER, OF CHICAGO, ILLINOIS, ASSIGNOR TO UNIVERSAL RIM COMPANY, OF CHICAGO, ILLINOIS, A CORPORATION OF ILLINOIS.

TRANSPLIT DEMOUNTABLE RIM.

1,314,938.     Specification of Letters Patent.     Patented Sept. 2, 1919.

Application filed August 14, 1916. Serial No. 114,803.

*To all whom it may concern:*

Be it known that I, ERLE KING BAKER, a citizen of the United States, residing at Chicago, Cook county, Illinois, have invented certain new and useful Improvements in Transplit Demountable Rims, of which the following is a specification.

My invention relates to improvements in demountable wheels and rims, and has special reference to improvements in demountable rims which are adapted to carry pneumatic tires in inflated condition.

In dealing with demountable rims, it is necessary that the same shall be formed for easy assembly with the tire and shall be easy to detach. In the case of rims of the clencher type, it is desirable, and in the case of rims of the straignht-side it is essential, that the rims, it of the integrally flanged form, shall be transplit. By "transplit" I means transversely cut across to form rim ends which may be helically separated. When a rim has been transplit it becomes necessary to provide means for connecting the ends of the rim at times when it is on the wheel, and it is also desirable that the rim-end connecting means shall be adapted to always hold the rim ends in alinement and prevent their dis-alinement in any direction.

The object of my invention is to simplify the construction of transplit demountable rims, and to improve the action thereof.

The general nature and principles of my invention, and also the details of the best embodiment thereof that I have thus far devised, will be readily understood on reference to the drawings which form part of this specification, and are particularly pointed out in the appended claims.

Referring to the drawings:—Figure 1 is an outer side elevation of a fully equipped motor vehicle embodying my invention;—Fig. 2 is an enlarged side view of a portion of the rim and wheel, parts thereof being in section, on substantially the middle plane of the wheel;—Fig. 3 is a section on the curved line X—X of Fig. 2, the same showing the inner periphery of the rim at the split;—Fig. 4 is a cross-section on the line Y—Y of Fig. 2;—and Fig. 5 is a modified form of the locking device.

In the drawings, 1 represents the hub of the wheel;—2 the spokes;—3 the felly;—4 the felly-band or fixed rim;—5 the demountable rim;—6 several clamping devices by which the same is secured on the fixed rim;—and, 7 the pneumatic tire.

The demountable rim is provided with integral flanges $5^a$; and, in order that it may be put into and taken out of the tire, it is transplit. In the present instance I cut the rim transversely across upon the major diagonal line, A, and upon a minor reversely diagonal line, B. In this manner I form the rim ends, $5^b$ and $5^c$. A split much the same is generally described and claimed in my pending application Serial No. 86,598. Thus formed, the rim ends are self-alining; that is, they are adapted to withstand the compressive force of an inflated pneumatic tire, without dislodgment. In the rim-end, $5^c$, I provide a hole, 8, and in this I place a hollow rivet, 9, having a large head, 10. In forming the hole, 8, I press down the metal from the body of the rim, making a sleeve or boss, 8', which is integral with the rim. As shown in Fig. 4, the head, 10 of the rivet is larger than the boss, 8, and serves to confine on the latter a latch-plate, 11. In the felly band, 4, I form a hole, 12, which receives the head, 10, of the rivet, 9. In this manner one end of the rim is anchored to the felly band, when the rim is placed thereon. In the opposite end, $5^b$, of the rim, I form another hole and integral boss, 13, and therein secure a solid rivet, 14, having a large head, 15. This head, like the other, is accommodated in a hole, 16, in the felly band. Thus the other end of the rim is anchored to the felly band. The two studs or rivets together with the intervening portion of the felly band, or fixed rim, constitute an effective rim end connector, by which the rim ends are positively and non-adjustably, but detachably, connected, when on the wheel. The plate, 11, obviously, is swiveled on the boss, 8'. Its free end, 8", is formed to swing beneath the head, 15, of the rivet or stud, 14. When in that position the plate extends across the split, A, and being firmly held between the inner periphery of the rim and the heads of the two rivets or studs, it serves to prevent the radial disalinement of the rim ends. When desired, the end of the latch may be formed as a hook, 8''', to further engage and co-act with the stud, 14, as shown in Fig. 5.

This simple device adds little to the cost of the demountable rim, and admirably serves the desired purposes.

I desire that it be understood that the described latch may be used with rims which are transplit upon other than diagonal lines, though the construction herein disclosed is much to be preferred. It is obvious that a hollow rivet, 9, is not required, unless it is desired to accommodate the valve stem, 7', of the tire in the manner shown in these drawings.

Having thus described my invention, I claim as new and desire to secure by Letters Patent:—

1. A transplit demountable rim having a struck-down boss on one end, in combination with a latch plate swiveled on said boss and a headed rivet within said boss, and holding said plate on the rim.

2. A demountable tire-carrying rim, the tire embracing part being of one piece and being diagonally split across at one point in its circumference in a manner to cause its rim ends to be self-alining, in combination with a latch-plate, pivoted on one end of the rim and normally engaged beneath a headed stud on the other end of the rim to prevent radial disalinement of the rim ends, and the pivoted end of said latch containing a valve stem hole.

3. A transplit demountable rim of which the tire-embracing part is in one piece, in combination with two driving studs, one on each of the ends of said single tire-embracing part, one of said studs being hollow and thus presenting a valve stem hole and a latch plate pivoted on said hollow stud and formed to interlock with the other stud on the other end of the rim.

In testimony whereof, I have hereunto set my hand this 9th day of August, 1916.

ERLE KING BAKER.